United States Patent [19]

Bousmar

[11] 3,925,614

[45] Dec. 9, 1975

[54] RECEIVER FOR THE RECEPTION OF PULSE SIGNALS TRANSMITTED BY MEANS OF FREQUENCY SHIFT MODULATION

[75] Inventor: Michel Antony Marie Joseph Bousmar, Brussels, Belgium

[73] Assignee: U.S. Philips Corporation, New York, N.Y.

[22] Filed: Sept. 30, 1974

[21] Appl. No.: 510,660

[30] Foreign Application Priority Data

Sept. 28, 1973 Netherlands ..................... 7313361

[52] U.S. Cl. .................. 178/88; 325/320; 329/128

[51] Int. Cl.[2] .......................................... H04L 27/14

[58] Field of Search ............ 178/66 R, 88; 325/320, 325/349, 487; 329/110, 112, 116, 126, 128; 328/133, 140, 141; 307/225, 233

[56] References Cited

UNITED STATES PATENTS 3,778,727 11/1973 Williams ......................... 325/320 X 3,796,942 3/1974 Bynum ............................ 328/140 X

*Primary Examiner*—Benedict V. Safourek

*Attorney, Agent, or Firm*—Frank R. Trifari; Henry I. Steckler

[57] ABSTRACT

In a receiver for frequency shift modulation an accurate demodulation of the received signal and a low sensitivity to noise and interference is obtained by using a frequency discriminator in which a number of parallel channels are incorporated between a common frequency generator and a phase comparator and in which each channel includes a frequency divider provided with a phase adjusting circuit, while the different frequency dividers are cyclically adjusted in phase as a function of the zero crossings in the received signal and the demodulated signal is derived from a low-pass filter connected to the phase comparator.

7 Claims, 7 Drawing Figures

RECEIVER FOR THE RECEPTION OF PULSE SIGNALS TRANSMITTED BY MEANS OF FREQUENCY SHIFT MODULATION

The invention relates to a receiver for the reception of pulse signals transmitted by means of frequency shift modulation in which the received modulated pulse signals are applied to a frequency discriminator from which the demodulated pulse signals are derived. Such a receiver is generally known and may be utilized both for synchronous and asynchronous transmisssion of pulse signals particularly in carrier telegraphy systems transmitting a number of telegraphy signals in frequency multiplex within the frequency band of a speech channel.

It is an object of the invention to provide a novel conception of a receiver of the type described in which a very accurate demodulation of the received demodulated pulse signals is accompanied by a low sensitivity to noise and interference by signals in adjacent frequency bands, but which is nevertheless simple in structure and does not impose special requirements on the tolerances of the different components and is additionally very suitable for use of digital structural elements and thus for integration in a semiconductor body.

The receiver according to the invention is characterized in that the frequency discriminator includes a number of parallel channels whose inputs are connected to a common generator having a fixed frequency and whose outputs are connected to a phase comparator, each channel including a frequency divider provided with a phase adjusting circuit for generating output signals at a frequency which is equal for all channels and which is higher than the highest frequency of the received modulated pulse signals, the frequency discriminator furthermore including a zero crossing detector for generating set pulses as a function of the zero crossings in the received modulated pulse signals, said set pulses being cyclically applied to the phase adjusting circuits of the different frequency dividers, the output signals of two channels being compared in phase in the phase comparator and the demodulated pulse signals being derived from a low-pass filter connected to the output of the phase comparator.

The invention and its advantages will now be described in greater detail with reference to the Figures.

Figure 1:
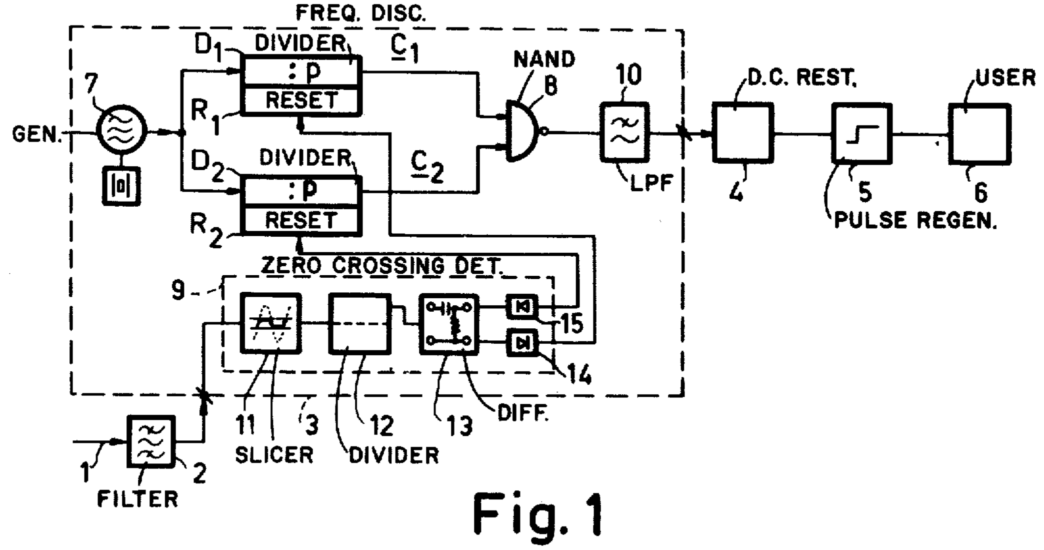
FIG. 1 shows a receiver according to the invention.

The receiver shown in FIG. 1 is arranged as a channel receiver in a carrier telegraphy system in which telegraphy signals are transmitted at a rate of, for example, 50 Baud by means of frequency shift keying. A bandwidth of 120 Hz is available per channel and the frequency shift between mark and space frequency is 2×30 Hz. In the receiver of FIG. 1 the central frequency of the channel is, for example, 3180 Hz and the mark and space frequencies are 3150 Hz and 3210 Hz, respectively.

The signals derived from a transmission path 1, which vary in frequency in accordance with the signal elements of the telegraphy signal, are applied through a channel filter 2 having a passband of 3120–3240 Hz to a frequency discriminator 3 which supplies a high or a low direct voltage dependent on whether the mark or the space frequency is received. The telegraphy signal thus demodulated is applied through a d.c. restorer 4 eliminating shifts in the d.c. level to a pulse regenerator 5 whose output signal is passed on for further processing to a user 6. The structure and operation of the d.c. restorer 4 and the pulse regenerator 5 are generally known and are of secondary importance for the present invention; typical examples of their embodiment are described in U.S. Pat. Specifications Nos. 3,008,007 and 2,979,567.

For accurate recovery of the telegraphy signal the frequency discriminator 3 in the receiver according to the invention includes a number of parallel channels $C_1$, $C_2$ whose inputs are connected to a common generator 7 having a fixed frequency and whose outputs are connected to a phase comparator 8, which channels $C_1$, $C_2$ each include frequency dividers $D_1$, $D_2$ provided with phase adjusting circuits $R_1$, $R_2$ for generating output signals having a frequency which is equal for all channels $C_1$, $C_2$ and is higher than the highest frequency of the received frequency shift telegraphy signal; furthermore the frequency discriminator 3 includes a zero crossing detector 9 for generating set pulses as a function of the zero crossings in the received frequency shift telegraphy signals, which set pulses are cyclically applied to the phase adjusting circuits $R_1$, $R_2$ of the different frequency dividers $D_1$, $D_2$, while the output signals from two channels are compared in phase in the phase comparator 8 and the recovered telegraphy signals is derived from a lowpass filter 10 connected to the output of the phase comparator 8.

In this embodiment the frequency dividers $D_1$, $D_2$ are constituted by binary counters whose inputs are connected to the generator 7 formed as a pulse generator and the phase adjusting circuits $R_1$, $R_2$ are constituted by reset circuits connected to all stages of the binary counters which upon application of a set pulse return the relevant binary counter to its initial state. Furthermore the zero crossing detector 9 is constituted, for example, by a slicer 11 whose limiting levels are adjusted on either side of the zero level, followed by a bistable trigger 12 connected as a two-to-one divider and a differentiating network 13 connected thereto whose positive or negative output pulses are applied as set pulses through halfwave rectifiers 14, 15 having opposite polarities to the reset circuits $R_1$, $R_2$, respectively. The phase comparator 8 is a logical coincidence gate which is formed, for example, as a NAND-gate while the lowpass filter 10 is formed as a smoothing filter for the output signal of the phase comparator 8.

The recovery of the telegraphy signal in the receiver according to the invention will now be described with reference to the time diagrams in FIG. 2.

Figure 2:
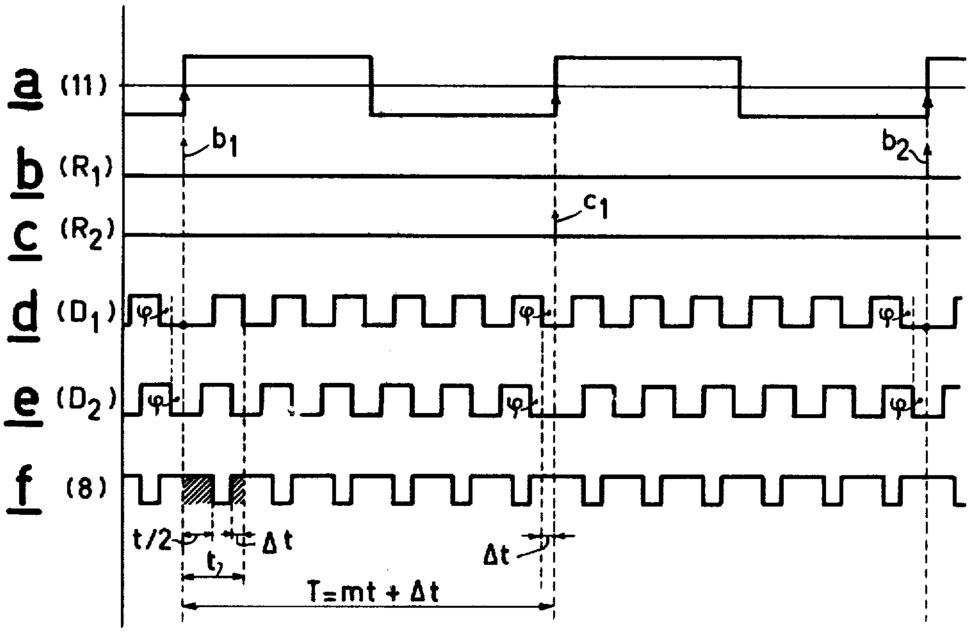
FIG. 2 shows a number of time diagrams for explaining the operation of the receiver according to FIG. 1.

The substantially rectangular signal shown at *a* in FIG. 2 is obtained from the frequency shift telegraphy signal occurring at the output of channel filter 2 by means of slicing in slicer 11. When this signal *a* is applied to the cascade arrangement of two-to-one divider 12, differentiating network 13 and rectifiers 14, 15, the pulse series *b* is produced at the output of rectifier 14 and the pulse series *c* is produced at the output of rectifier 15. The pulses in these pulse series *b* and *c* coincide with zero crossings in a positive sense of the signal *a* while a pulse in pulse series *c* occurs between two successive pulses in pulse series *b* and conversely. These pulse series *b* and *c* are applied as set pulses to the reset circuits $R_1$ and $R_2$ of the binary counters $D_1$ and $D_2$, respectively.

By division of the fixed frequency of the common generator 7 in the two binary counters $D_1$, $D_2$ the rectangular output signals of channels $C_1$ and $C_2$ are obtained which are shown at *d* and *e*, respectively. The frequencies of these signals *d* and *e* are identical and are a factor of *m* higher than the highest frequency in the frequency shift telegraphy signal at the output of channel filter 2. Since these signals *d* and *e* are obtained by means of frequency dividers, their phases may difffer. If the two binary counters $D_1$, $D_2$ effect a frequency division with a division factor of *p*, their output signals may occur in p different phases and thus the phase difference between these signals may assume *p* different discrete values. The value of this phase difference is dependent on the instants when the set pulses occur in pulse series *b* and *c* because these set pulses alternately return the two binary counters $D_1$ and $D_2$ to their initial state.

Apart from the quantization of the phases of signals *d* and *e* in *p* discrete values, there applies that at the instant when, for example, binary counter $D_2$ is returned to its initial state by a set pulse $c_1$ the output signal *d* of binary counter $D_1$ has a phase $\phi$ which is directly related to the time interval between this set pulse $c_1$ and the preceding set pulse $b_1$ by which this binary counter $D_1$ has been returned to its initial state. This phase difference $\phi$ between the signals *d* and *e* remains until the instant when the next set pulse $b_2$ returns binary counter $D_1$ to its initial state because the frequencies of the signals *d* and *e* are identical. At each next set pulse in the pulse series *b* and *c* a phase difference between the signals *d* and *e* is alternately brought about by one or the other binary counter and thus there is a direct relationship between the absolute value of this phase difference and the time interval between two successive zero crossings in a positive sense of the signal *a* and consequently the period of the frequency shift telegraphy signal.

If the output signals *d* and *e* of the two channels $C_1$ and $C_2$ are compared in phase in phase comparator 8, the signal shown at *f* is produced at the output of phase comparator 8 from which signal a signal is obtained with the aid of lowpass filter 10 whose value is directly proportional to the frequency of the received frequency shift telegraphy signal.

Thus a frequency discriminator is obtained with a linear frequency characteristic, which discriminator has a great sensitivity even to signals in which the highest and lowest frequencies only show comparatively small frequency differences. By applying the output signal of this frequency discriminator 3 through d.c. restorer 4 to pulse regenerator 5, whose decision level is adjusted at a suitable chosen value, the original telegraphy signal is accurately recovered.

The frequency characteristic of the frequency discriminator 3 may be derived in a simple manner from the time diagrams of FIG. 2. In this derivation the quantization of the phases of the signals *d* and *e* in *p* discrete values is again left out of consideration.

FIG. 2 shows that if the absolute value of the phase difference $\phi$ between the signals *d* and *e* is between 0° and 180° there applies for the time difference $\Delta t$ corresponding to $\phi$ that $$0 \leq \Delta t \leq t/2 \qquad (1)$$

in which *t* represent the period of the signals *d* and *e* in channels $C_1$ and $C_2$. When a frequency *F* is received there applies for the period $T = 1/F$ of signal *a* that:

$$T = mt + \Delta t \qquad (2)$$

because the frequency of the signals *d* and *e* is a factor of *m* higher than the highest frequency in the received frequency shift telegraphy signal.

For the mean value *V* of the output signal of lowpass filter 10 there follows from FIG. 2 that:

$$V = [\, m\,(t/2 + \Delta t) + \Delta t \,]\; V_0/T \qquad (3)$$

in which $V_0$ represents the difference between the high and low values of the output signal of NAND-gate 8. With formula (2) there follows that:

$$V = [\, m + 1 - m\,(m + ½)\, t/T \,]\; V_0 \qquad (4)$$

If $F_2$ and $F_1$ represent the highest and lowest received frequencies, i.e., the frequencies corresponding to $\phi$ = 0° and $\phi$ = 180°, there applies that:

$$(1/F_2) = mt \leq (1/F) = T \leq (1/F_1) = (m + ½)\, t \qquad (5)$$

by means of which formula (4) may be written as: $V = [1 - (F - F_1)/2\,(F_2 - F_1)]\; V_0 \qquad (6)$ This formula (6) shows that the frequency discriminator 3 has a linear frequency characteristic between the frequencies $F_1$ and $F_2$ given by the inequality (5). This frequency discriminator 3 has also a great sensitivity for signals in which the extreme frequencies $F_1$ and $F_2$ are close together. To obtain the maximum variation of *V* in formula (6) it is sufficient to choose such a value for m that the absolute value of $\phi$ varies from 0° to 180° for the two extreme frequencies $F_2$ and $F_1$. It can then be derived from the inequality (5) that there must apply:

$$F_1 : F_2 = mt : (m+½)t \qquad (7)$$

from which it follows that m must satisfy the condition:

$$m \leq F_1/2(F_2 - F_1) \qquad (8)$$

in which in (8) the equality sign gives the value of *m* for a maximum sensitivity.

In the considerations given so far the quantization of the phase difference $\phi$ in *p* discrete values has been left out of consideration. The influence of the errors caused by this quantization on the output signal of the frequency discriminator 3 is, however, comparatively small because of the quantization errors are averaged in lowpass filter 10 over a number of periods *T* of the frequency shift telegraphy signal. This influence, little as it is, may be further reduced because the magnitude of the maximum quantization error can be reduced by an arbitrary factor by increasing the division factor *p* of the two binary counters $D_1$, $D_2$ with a corresponding factor. In practice a division factor of *p* = 16 is found to be sufficient to obtain acceptable values for the quantization noise at the output of frequency discriminator 3. The deviations of the output signal of the frequency discriminator 3 from the value *V* given by formula (6) are then substantially negligible.

Thus a frequency discriminator having a linear frequency characteristic is obtained in which also for frequency shifts which are small relative to the central frequency of the channel a great sensitivity is accompanied by a very accurate demodulation of the received modulated pulse signals. In this discriminator the factor *m* that the frequency of the output signals in the channels $C_1$, $C_2$ is higher than the highest received frequency $F_2$ determines the sensitivity, and the division factor p of the frequency dividers $D_1$, $D_2$ in these channels $C_1$, $C_2$ determines the accuracy. Both factors p and m together determine the frequency $F_c$ of the common generator 7 for which there applies that:

$$F_c = p\ m\ F_2 \qquad (9)$$

In the channel receiver of FIG. 1 for a telegraphy signal having a mark and a space frequency of 3150 Hz and 3210 Hz, respectively, the discriminator is to have a linear frequency characteristic between the lowest received frequency $F_1$ = 3210 Hz and the highest received frequency $F_2$ = 3240 Hz. For a maximum sensitivity there follows from formula (8) for the factor $m$ the value $m = F_1 2\ /2\ (F_2 - F_1) = 3120/2\times120 = 13$ while for the accuracy required in practice the division factor $p$ must have the value 16 so that there follows from formula (9) for the frequency $F_c$ of the generator 7 that: $F_c = p\ m\ F_2 = 16\times13\times3240 = 673{,}920$ kHz For the same accuracy in the determination of the characteristic instants when the instantaneous frequency of the received modulated pulse signal is equal to the central frequency of the channel, a clock pulse generator having a clock frequency which is at least a factor of 32 higher than the above-mentioned value for the frequency $F_c$ of generator 7, would be necessary in known entirely digitally constructed frequency discriminators of the counter type.

For a given accuracy the relevant frequency discriminator has a much lower sensitivity to noise and interference by signals in adjacent frequency bands than these known digital frequency discriminators.

Figure 3:
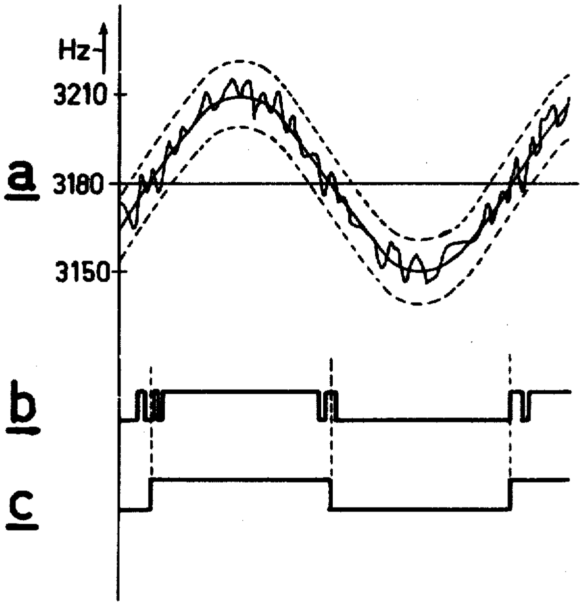
FIG. 3 shows a number of time diagrams and FIG. 4 shows a vector diagram for explaining the influence of noise on the receiver of FIG. 1.
Figure 4:
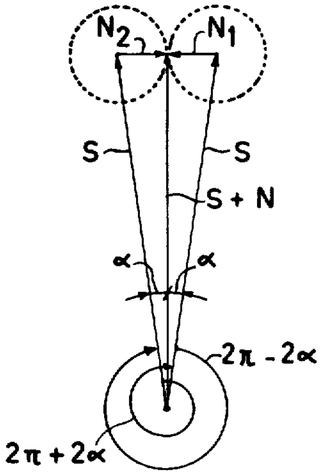

The influence of noise on the received pulse signal and the demodulated pulse signal will be described with reference to the time diagrams in FIG. 3 and the vector diagram in FIG. 4. FIG. 3 shows at *a* how the instantaneous frequency of the received modulated pulse signal may vary for a channel with a central frequency of 3180 Hz and a signal-to-noise ration of 40 dB. The broken-line curves indicate the limits within which the instantaneous frequency varies. These limits may be derived from the vector diagram of FIG. 4. The received pulse signal itself with a frequency F is represented by the vector S and the effective value of the noise is represented by the vector N. The instantaneous frequency is found from the time interval between two successive crossings of the sum vector $S+N$ through the zero phase. The maximum deviations of the frequency $F$ caused by noise occur if between two zero crossings of the sum vector $S+N$ the noise vector N turns from the position $N_1$ in FIG. 4 over 180° to the position $N_2$ in FIG. 4, or conversely. The time interval between two zero crossings then varies between $(2\pi - 2\alpha)/2\pi F$ and $(2\pi + 2\alpha)/2\pi F$ with $\alpha = \sin^{-1}$ (N/S); the maximum deviation of F then is $\Delta F = \pm\alpha F/\pi$. In the relevant example with N/S = − 40 dB/, $\alpha = 0.6°$ and for F = 3180 Hz there follows that $\Delta F = \pm 10.6$ Hz.

If the signal shown at *a* in FIG. 3 is applied to known digital frequency discriminators having a high accuracy, a demodulated pulse signal of the shape shown at *b* in FIG. 3 is produced. The jitter occuing therein around the desired characteristic instants is absolutely inacceptable in practice. When on the other hand the present frequency discriminator is used, this jitter is substantially negligible because the deviations $\Delta F$ caused by noise are averaged over a number of periods $T = 1/F$ of the received modulated pulse signal in lowpass filter 10. The demodulated pulse signal then substantially does not deviate from the ideal shape shown at *c* in FIG. 3.

Figure 5:
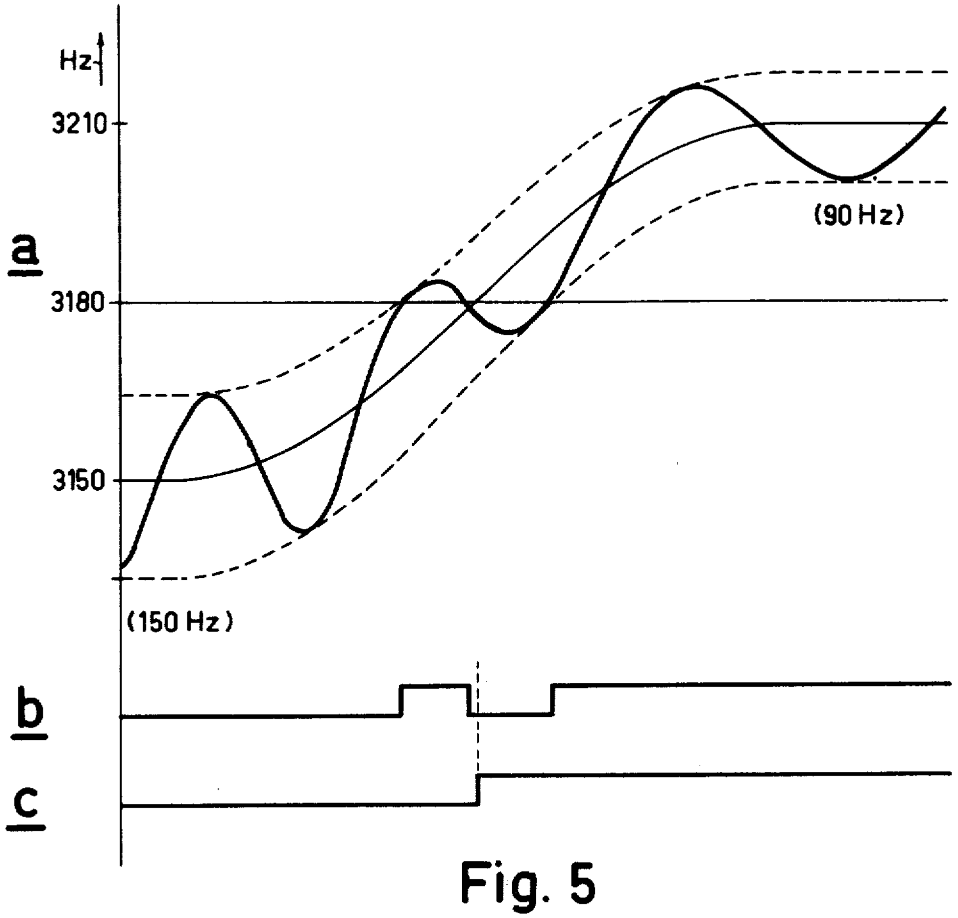
FIG. 5 shows a number of time diagrams for explaining the influence of interference in adjacent frequency bands on the receiver of FIG. 1.

The influence of interference by signals in adjacent frequency bands is further explained with reference to the time diagrams in FIG. 5. FIG. 5 shows at *a* how the instantaneous frequency of the received modulated pulse signal varies if in an adjacent channel only the central frequency is transmitted and the input filter 2 of the channel receiver in FIG. 1 attenuates this frequency at a distance of 120 Hz from its central frequency by 29 dB. It is to be noted that the variation shown at *a* in FIG. 5 can be mathematically calculated. When using known digital frequency discriminators having a high accuracy the demodulated pulse signal has the shape shown at *b* in FIG. 5. This proves that also in this case the demodulated pulse signal exhibits unacceptable distortions which can only be reduced by giving the input filter 2 a much greater attenuation for frequencies in adjacent channels. On the other hand, when using the present frequency discriminator, the demodulated pulse signal has in practice substantially the ideal shape shown at *c* in FIG. 5 thanks to the averaging which is effected in lowpass filter 10. It can be proved mathematically that the mean value of the deviations from the desired instantaneous frequency from the received pulse signal, which deviations are caused by the interfering frequency, is already equal to zero if these deviations are averaged over only one period of the difference frequency between the interfering frequency and the desired instantaneous frequency (in this case over one period of a frequency which lies between 120 + 30 = 150 Hz and 120 − 30 = 90 Hz).

The lowpass filter 10 used in the described frequency discriminator thus provides a very efficient protection against both noise and interference by signals in adjacent frequency bands so that the requirements to be imposed on the input filter 2 of the channel receiver can be considerably mitigated.

In addition, all above-mentioned advantages are obtained with a frequency discriminator which has a very simple structure and does not impose special requirements on the tolerances of the different components. Furthermore this frequency discriminator may largely be composed of digital structural elements and may thus be fairly simply formed with circuits integrated in a semiconductor body.

Figure 6:
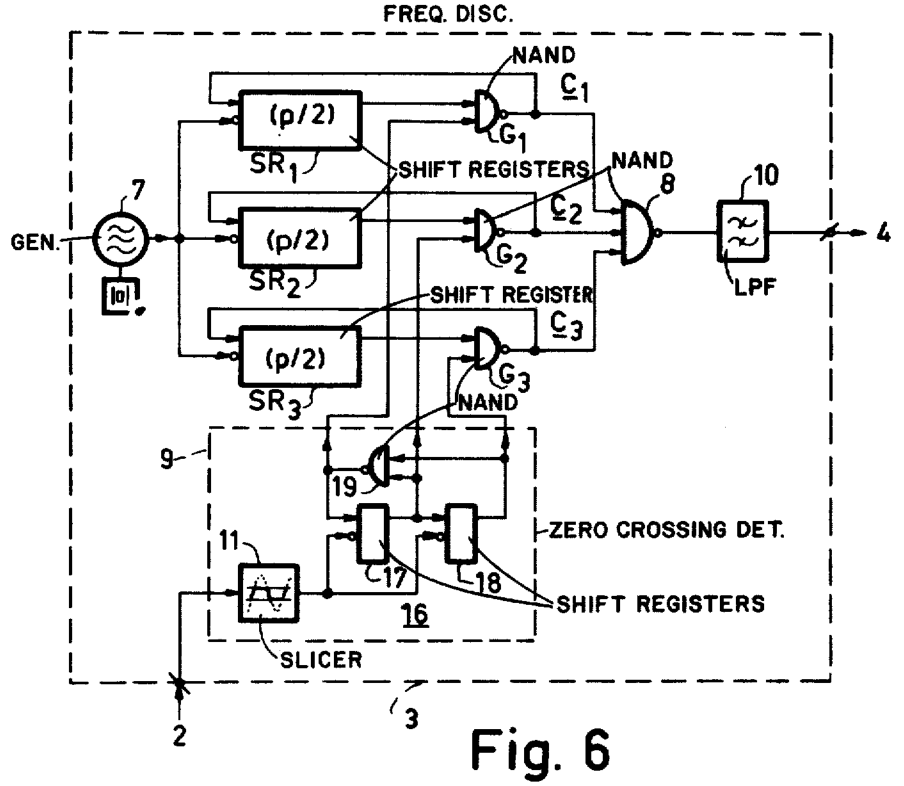
FIG. 6 shows a modification of the frequency discriminator used in the receiver according to FIG. 1.

FIG. 6 shows a modification of the frequency discriminator 3 in FIG. 1 which is particularly suitable for large scale integration using MOS-techologies. Corresponding elements have the same reference numerals in FIGS. 1 and 6. The frequency discriminator according to FIG. 6 differs mainly from that in FIG. 1 with respect to the construction of the frequency dividers and the zero crossing detector for generating the set pulses for the phase adjustment of the frequency dividers.

To realise the frequency division by a factor of *p*, FIG. 6 uses a shift register having *p*/2 stages and a logical gate arranged between output and input of this shift register. When using MOS-technologies for the integration such a frequency divider requires considerably fewer components than the binary counter used in FIG. 1 because of the values of the division factor p which are comparatively low in practice. If in this case also two channels are used, the phase adjustment of the frequency dividers can only be realised by resetting all stages of a shift register simultaneously to their initial state. Per shift register stage more components are then, however, required so that the obtained economy in the number of components is partly lost again. To obviate this difficulty the number of channels in FIG. 6 has been extended to three so that the required phase adjustment of the frequency dividers can be realised in a simple manner. The structure of the zero crossing detector in FIG. 6 is adapted to this extension in the number of channels and the modified method of phase adjustment.

In the embodiment of FIG. 6 each of the three channels $C_1$, $C_2$, $C_3$ includes a shift register $SR_1$, $SR_2$, $SR_3$ with $p/2$ stages while the output of the last stage is connected through a logical selection gate $G_1$, $G_2$, $G_3$ in the form of a NAND-gate to the input of the first stage. Furthermore, the clock inputs of the shift registers $SR_1$, $SR_2$, $SR_3$ are connected to the common pulse generator 7 while the outputs of the NAND-gates $G_1$, $G_2$, $G_3$ are connected to the phase comparator 8 which is now constituted by a NAND-gate having 3 inputs.

The zero crossing detector 9 in FIG. 6 includes a slicer 11 followed by a three-to-one divider 16. This three-to-one divider 16 is formed, for example, as a shift register having two stages 17, 18 whose clock inputs are connected to slicer 11 while the outputs of the two stages 17, 18 are connected through a NAND-gate 19 to the input of the first stage 17. The output signals of the three-to-one divider 16 occur at the input of stage 17, the output of stage 17 and the output of stage 18. The output signals are applied in this sequence as set pulses for the phase adjustment of the frequency dividers in the channels $C_1$, $C_2$, $C_3$ to the NAND-gate $G_1$, $G_2$, $G_3$.

Figure 7:
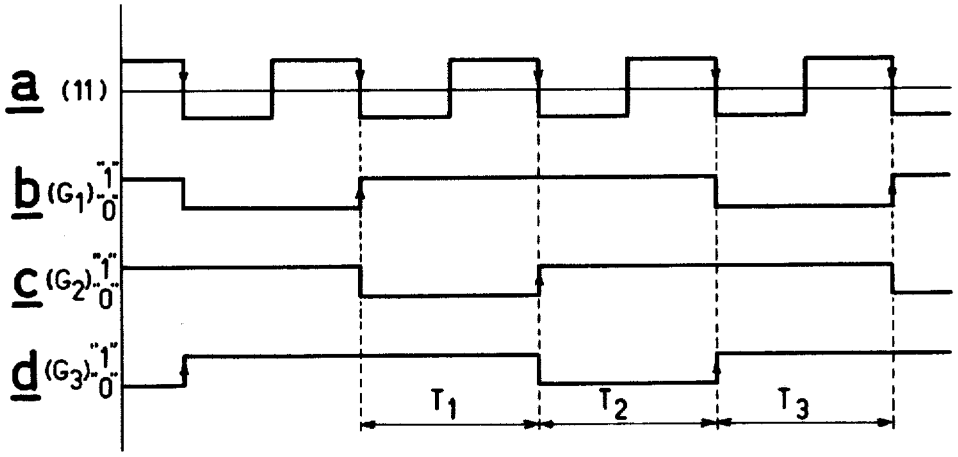
FIG. 7 shows a number of time diagrams for explaining the operation of the frequency discriminator according to FIG. 6.

The operation of the frequency discriminator in FIG. 6 will now be described with reference to the time diagrams in FIG. 7. When the received modulated pulse signal is applied to slicer 11, the signal shown at *a* in FIG. 7 is produced at its output. The series of set pulses formed by three-to-one divider 16 from this signal *a* for the NAND-gates $G_1$, $G_2$, $G_3$ are shown at *b*, *c* and *d* in FIG. 7. The leading and trailing edges of the set pulses in these pulse series *b*, *c* and *d* always coincide with zero corssings in a negative sense of signal *a* while in each of the pulse series the set pulse has a low value (logical value 0) during one period and a high value (logical value 1) during the two other periods per three successive periods of the signal *a*. The cyclic character of the set pulses for the different channels $C_1$, $C_2$, $C_3$ is apparent from FIG. 7.

For the interval of 3 periods of signal *a* in FIG. 7 the set pulse of, for example, pulse series *c* has a logical value 0 during the first period $T_1$ so that NAND-gate $G_2$ is blocked and a logical value 1 always occurs at the input of shift register $SR_2$. During the entire first period $T_1$ the pulses of pulse generator 7 shift this logical value 1 through shift register $SR_2$ and the output signal of channel $C_2$ likewise has the logical value 1. At the commencement of the second period $T_2$ this shift register $SR_2$ is in its initial state in which all stages have the same content, namely the logical value 1. At that instant the set pulse of pulse series *c* assumes the logical value 1 so that NAND gate $G_2$ is enabled and shift register $SR_2$ can function as a frequency divider. The frequency of the output signal of channel $C_2$ is then a factor of *p* lower than that of pulse generator 7, while the phase of this signal depends on the instant when the transition of the logical value 0 to the logical value 1 is effected for the set pulse of pulse series *c*, which transition coincides with the zero crossing in a negative sense of the signal *a* at the start of the second period $T_2$. For channel $C_2$ the first period $T_1$ is thus utilized for preparing the phase adjustment at the start of the second period $T_2$, while during the second and third periods $T_2$ and $T_3$ a frequency division by a division factor of p is realised, the phase of the frequency-divided signal being determined by the instant when the second period $T_2$ starts. The same considerations apply mutatis mutandis for the two other channels $C_1$ and $C_3$ where the phase of the frequency-divided signal in channel $C_1$ is determined by the instant of commencement of the first period $T_1$ and that in channel $C_3$ by the instant of commencement of the third period $T_3$.

The output signals of two of the three channels $C_1$, $C_2$, $C_3$ are cpmpared in phase in phase comparator 8 during each period of signal *a* in FIG. 7, while the third channel in which the phase adjustment is prepared does not influence the phase comparison. For example, during the first period $T_1$ the phases of the output signals in channels $C_1$ and $C_3$ are compared while the then constant output signal of channel $C_2$ does not have any influence on this phase comparison because the logical value 1 then occuring in this channel $C_2$ only enables the phase comparator 8 formed as a NAND-gate for the output signals of the channels $C_1$ and $C_3$. Likewise a phase comparison is effected between the output signals of channels $C_1$ and $C_2$ during the second period $T_2$ and between the output signals of the channels $C_2$ and $C_3$ during the third period $T_3$.

Since the relationship between the phase difference of the output signals of the channels taking part in the phase comparison and the period of the modulated pulse signal for the frequency discriminators according to FIGS. 6 and 1 is the same, their frequency characteristics are also the same and the frequency discriminator according to FIG. 6 has all the advantageous properties already described with reference to FIG. 1.

In the described embodiments of FIG. 1 and FIG. 6 the phase of the frequency dividers is always adjusted at one given type of zero crossing of the received modulated pulse signal, namely exclusively at a zero crossing in a positive sense (FIG. 1) or exclusively at a zero crossing in a negative sense (FIG. 6). The invention is, however, not limited to these embodiments and it is, for example, possible to adjust the phase of the frequency dividers at each zero crossing of the received modulated pulse signal. In the channel receiver according to FIG. 1 the bistable trigger 12 formed as a two-to-one divider may be omitted in the zero crossing detector 9. In this case a series of set pulses coinciding in a positive sense with the zero crossings occurs at the output of rectifier 14, and a series of set pulses coinciding with the zero crossings in a negative sense occurs at the output of rectifier 15. This modification has no essential influence on the operation and properties of the frequency discriminator 3 of FIG. 1. The frequency characteristic may be derived in the same manner as in FIG. 1 in which for the mean value *V* of the output signal of lowpass filter 10 formula (6) already stated hereinbefore is found. The only difference now is that for the highest and lowest received frequencies $F_2$ and $F_1$ inequality (5) is replaced by the inequality below:

$$(1/F_2) = mt \leq (1/F) = T \leq (1/F_1) = (m+1)t \quad (10)$$

from which for $m$ in this case the condition $$m \leq F_1/(F_2-F_1) \quad (11)$$

follows in which the equality sign again gives the value $m$ for a maximum sensitivity.

This phase adjustment of the frequency dividers at each zero crossing of the received modulated pulse signal may alternatively be realized in the frequency discriminator according to FIG. 6. To this end a differentiating network followed by a full-wave rectifier is incorporated in the zero crossing detector 9 between the output of slicer 11 and the clock input of the shift register in three-to-one divider 16. The influence of this modification on the behaviour of the frequency discriminator in FIG. 6 is the same as that of the corresponding modification on the behaviour of the frequency discriminator 3 in the channel receiver according to FIG. 1.

What is claimed is:

1. A receiver for the reception of pulse signals transmitted by means of frequency shift modulation in which the received modulated pulse signals are applied to a frequency discriminator from which the demodulated pulse signals are derived, the frequency discriminator comprising a plurality of parallel channels whose inputs are coupled to a common generator having a fixed frequency and whose outputs are coupled to a plase comparator, each channel including a frequency divider provided with a phase adjusting circuit, said divider having output means for providing output signals at a frequency which is equal for all channels and which is higher than the highest frequency of the received modulated pulse signals, said frequency discriminator furthermore including a zero crossing detector for generating set pulses as a function of the zero crossings in the received modulated pulse signals, said set pulses being cyclically applied to the phase adjusting circuits of the different frequency dividers, the output signals of two channels being compared in phase in the phase comparator and the demodulated pulse signals being derived from a lowpass filter coupled to the output of the phase comparator.

2. A receiver as claimed in claim 1, wherein the frequency discriminator includes two parallel channels each being provided with a frequency divider having a number of stages, said phase adjusting circuit comprising a reset circuit coupled to all stages of the frequency divider, said reset circuit resetting all stages of the frequency divider simultaneously to their initial state when a set pulse of the zero crossing detector is applied.

3. A receiver as claimed in claim 2, wherein the zero crossing detector includes a slicer whose output is coupled to the reset circuits through a differentiating network and a half-wave rectifier of opposite polarity for the two reset circuits.

4. A receiver as claimed in claim 3, wherein a two-to-one divider is incorporated between the slicer and the differentiating network.

5. A receiver as claimed in claim 1, wherein the frequency discriminator includes three parallel channels each being provided with a frequency divider in the form of a shift register whose clock input is coupled to the common generator and whose output is coupled to the input through a logical selection gate whose output is coupled to the phase comparator, said logical selection gate also comprising the phase adjusting circuit of the frequency divider, said set pulses of the zero crossing detector blocking always one of the three logical gates in a cyclic sequence for obtaining a constant output signal of the relevant channel and for resetting the relevant shift register to its initial state.

6. A receiver as claimed in claim 5, wherein the zero crossing detector includes a slicer whose output is coupled to a three-to-one divider which has three outputs for deriving the set pulses therefrom for the three logical selection gates.

7. A receiver as claimed in claim 6, wherein a differentiating network followed by a full-wave rectifier is incorporated between the slicer and the three-to-one divider.

* * * * *